United States Patent
Hilliges et al.

(10) Patent No.: US 9,857,470 B2
(45) Date of Patent: *Jan. 2, 2018

(54) USING PHOTOMETRIC STEREO FOR 3D ENVIRONMENT MODELING

(71) Applicant: Microsoft Corporation, Redmond, WA (US)

(72) Inventors: Otmar Hilliges, Cambridge (GB); Malte Hanno Weiss, Aachen (DE); Shahram Izadi, Cambridge (GB); David Kim, Cambridge (GB); Carsten Curt Eckard Rother, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 511 days.

This patent is subject to a terminal disclaimer.

(21) Appl. No.: 13/729,324

(22) Filed: Dec. 28, 2012

(65) Prior Publication Data
US 2014/0184749 A1 Jul. 3, 2014

(51) Int. Cl.
*G06T 15/04* (2011.01)
*G06T 17/20* (2006.01)
(Continued)

(52) U.S. Cl.
CPC .............. *G01S 17/89* (2013.01); *G06T 7/246* (2017.01); *G06T 7/586* (2017.01); *G06T 17/00* (2013.01);
(Continued)

(58) Field of Classification Search
CPC .................................. G06T 7/586; G06T 7/529
See application file for complete search history.

(56) References Cited

U.S. PATENT DOCUMENTS

| 4,627,620 A | 12/1986 | Yang |
| 4,630,910 A | 12/1986 | Ross et al. |

(Continued)

FOREIGN PATENT DOCUMENTS

| CN | 1523352 A | 8/2004 |
| CN | 201254344 B | 6/2010 |

(Continued)

OTHER PUBLICATIONS

Klein, G., and Murray, D. W. 2007. Parallel tracking and mapping for small AR workspaces. In Proceedings of the International Symposium on Mixed and Augmented Reality (ISMAR).

(Continued)

*Primary Examiner* — Kevin McInnish

(57) ABSTRACT

Detecting material properties such reflectivity, true color and other properties of surfaces in a real world environment is described in various examples using a single hand-held device. For example, the detected material properties are calculated using a photometric stereo system which exploits known relationships between lighting conditions, surface normals, true color and image intensity. In examples, a user moves around in an environment capturing color images of surfaces in the scene from different orientations under known lighting conditions. In various examples, surfaces normals of patches of surfaces are calculated using the captured data to enable fine detail such as human hair, netting, textured surfaces to be modeled. In examples, the modeled data is used to render images depicting the scene with realism or to superimpose virtual graphics on the real world in a realistic manner.

20 Claims, 10 Drawing Sheets

(51) Int. Cl.
  *G01S 17/89* (2006.01)
  *G06T 17/00* (2006.01)
  *G06T 19/00* (2011.01)
  *G06T 7/586* (2017.01)
  *G06T 7/246* (2017.01)

(52) U.S. Cl.
  CPC .. *G06T 19/006* (2013.01); *G06T 2207/10016* (2013.01); *G06T 2207/10024* (2013.01); *G06T 2207/10028* (2013.01); *G06T 2207/30244* (2013.01)

(56) References Cited

U.S. PATENT DOCUMENTS

| | | | |
|---|---|---|---|
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,644,689 A * | 7/1997 | Ban | G06T 15/10 345/424 |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,930,392 A | 7/1999 | Ho | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,147,764 A * | 11/2000 | Handa | B24B 37/04 356/512 |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |

(56) References Cited

U.S. PATENT DOCUMENTS

| | | | |
|---|---|---|---|
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2004/0104935 A1* | 6/2004 | Williamson et al. | 345/757 |
| 2007/0229498 A1* | 10/2007 | Matusik et al. | 345/420 |
| 2008/0026838 A1 | 1/2008 | Dunstan et al. | |
| 2008/0137101 A1* | 6/2008 | Spence et al. | 356/611 |
| 2008/0310757 A1 | 12/2008 | Wolberg et al. | |
| 2009/0231425 A1* | 9/2009 | Zalewski | 348/142 |
| 2012/0075343 A1 | 3/2012 | Chen et al. | |
| 2012/0147152 A1 | 6/2012 | Vogiatis et al. | |
| 2012/0163656 A1 | 6/2012 | Wang et al. | |
| 2012/0194516 A1 | 8/2012 | Newcombe et al. | |
| 2012/0194517 A1 | 8/2012 | Izadi et al. | |
| 2012/0194644 A1 | 8/2012 | Newcombe et al. | |
| 2012/0194650 A1 | 8/2012 | Izadi et al. | |
| 2012/0195471 A1 | 8/2012 | Newcombe et al. | |
| 2012/0196679 A1 | 8/2012 | Newcombe et al. | |
| 2013/0077059 A1* | 3/2013 | Marti | H04N 9/3185 353/69 |

FOREIGN PATENT DOCUMENTS

| | | |
|---|---|---|
| CN | 101872491 A | 10/2010 |
| CN | 102236912 A | 11/2011 |
| CN | 102681661 A | 9/2012 |
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Levoy, M., Pulli, K., Curless, B., Rusinkiewicz, S., Koller, D., Pereira, L., Ginzton, M., Anderson, S. E., Davis, J., Ginsberg, J., Shade, J., and Fulk, D. 2000. The digital Michelangelo Project: 3D scanning of large statues. In ACM Transactions on Graphics (SIGGRAPH).

Lorensen, W. E., and Cline, H. E. 1987. Marching cubes: A high resolution 3D surface construction algorithm. In ACM Transactions on Graphics (SIGGRAPH).

Newcombe, R. A., and Davison, A. J. 2010. Live dense re-construction with a single moving camera. In Proceedings of the IEEE Conference on Computer Vision and Pattern Recognition (CVPR).

Nguyen, H. 2007. Gpu Gems 3. Addison-Wesley Professional. Can be found at the following link: http://http.developer.nvidia.com/GPUGems3/gpugems3_pref01.html.

Osher, S., and Fedkiw, R. 2002. Level Set Methods and Dynamic Implicit Surfaces. Springer. Book.

Parker, S., Shirley, P., Livnat, Y., Hansen, C., and Sloan, P. 1998. Interactive ray tracing for isosurface rendering. In Proceedings of Visualization.

Pollefeys, M., Nist 'E R, D., Frahm, J. M., Akbarzadeh, A., Mordohai, P., Clipp, B., Engels, C., Gallup, D., Kim, S. J., Merrell, P., Salmi, C., Sinha, S., Talton, B., Wang, L., Yang, Q., Stew'e Nius, H., Yang, R., Welch, G., and Towles, H. 2008. Detailed real-time urban 3D reconstruction from video. International Journal of Computer Vision (IJCV) 78, 2-3, 143-167.

Purcell, T. J., Buck, I., Mark, W. R., and Hanrahan, P. 2005. Ray tracing on programmable graphics hardware. In ACM SIGGRAPH Courses.

Rusinkiewicz, S., Hall-Holt, O., and Levoy, M. 2002. Real-time 3D model acquisition. In ACM Transactions on Graphics (SIGGRAPH).

Seitz, S. M., Curless, B., Diebel, J., Scharstein, D., and Szeliski, R. 2006. A comparison and evaluation of multiview stereo reconstruction algorithms. In Proceedings of the IEEE Conference on Computer Vision and Pattern Recognition (CVPR).

Stuehmer, J., Gumhold, S., and Cremers, D. 2010. Real-time dense geometry from a handheld camera. In Proceedings of the DAGM Symposium on Pattern Recognition.

Thrun, S., Burgard, W., and Fox, D. 2005. Probabilistic Robotics. Cambridge: MIT Press.

Vogiatzis, G., Torr, P. H. S., Seitz, S. M., and Cipolla, R. 2008. Reconstructing relief surfaces. Image and Vision Computing (IVC) 26, 3, 397-404.

Wurm, K. M., Hornung, A., Bennewitz, M., Stachniss, C., and Burgard, W. 2010. OctoMap: A probabilistic, flexible, and compact 3D map representation for robotic systems. In Proceedings of the ICRA 2010 Workshop on Best Practice in 3D Perception and Modeling for Mobile Manipulation.

Zach, C., Pock, T., and Bischof, H. 2007. A globally optimal algorithm for robust TV-L1 range image integration. In Proceedings of the International Conference on Computer Vision (ICCV).

Zhou, K., Gong, M., Huang, X, and Guo, B. 2011. Data-parallel octrees for surface reconstruction. IEEE Transactions on Visualization and Computer Graphics 17.

Stein, F., and Medioni, G. 1992. Structural Indexing: Efficient 3-D Object Recognition. IEEE Transactions on Pattern Analysis and Machine Intelligence, vol. 14, No. 2, Feb. 1992.

Blog: Matt Cutts: Gadgets, Google, and SEO, 2010.

Channel Access Method—at the following link: http://en.wikipedia.org/wiki/Multiple_access_protocol#Circuit_mode_and_channelization_methods. Oct. 26, 2011.

Rusinkiewicz, S., and Levoy, M. Stanford University. Efficient Variants of the ICP Algorithm—at the following link: http://www.cs.princeton.edu/~smr/papers/fasticp/fasticp_paper.pdf, 2001.

RGB-D Mapping: Using Depth Cameras for Dense 3D Modeling of Indoor Environments—at the following link: http://ils.intel-research.net/publications/17; 2010.

RSS Advanced Reasoning with Depth Cameras 2010 Workshop Papers: "RGB-D Mapping: Using Depth Cameras for Dense 3D Modeling of Indoor Environments"—at the following link: http://ils.intel-research.net/publications/45.

Sparse Distance Learning for Object Recognition Combining RGB and Depth Information—at the following link: http://ils.intel-research.net/publications/47, 2011.

ICRA 2010 Workshop paper: "Manipulator and Object Tracking for in Hand Model Acquisition"—at the following link: http://ils.intel-research.net/publications/14.

(56) References Cited

OTHER PUBLICATIONS

"International Search Report & Written Opinion for PCT Patent Application No. PCT/US2014/016749", dated May 12, 2014, Filed Date: Feb. 18, 2014, 8 Pages.
Daniel, et al. "Pose Tracking from Natural Features on Mobile Phones", in IEEE/ACM International Symposium on Mixed and Augmented Reality, Sep. 15, 2008, pp. 125-134.
Breiman, Leo, "Random Forests", in Machine Learning, vol. 45, Issue 1, Oct. 2001, pp. 5-32.
Yeas, et al., "Creating Meaningful Environment Models for Augmented Reality", in IEEE Virtual Reality Conference, Mar. 8, 2008, pp. 295-296.
"International Search Report & Written Opinion for PCT Patent Application No. PCT/US2013/077736", dated Mar. 27, 2014, Filed Date: Dec. 26, 2013, 15 Pages.
Higo, et al. "A Hand-held Photometric Stereo Camera for 3-D Modeling", in International Conference on Computer Vision, Sep. 29, 2009, pp. 1234-1241.
Anderson, et al., "Augmenting Depth Camera Output Using Photometric Stereo", in Conference on Machine Vision Applications, Jun. 13, 2011, pp. 369-372.
Izadi, et al., "KinectFusion Real-time 3D Reconstruction and Interaction Using a Moving Depth Camera", in Proceedings of ACM Symposium on User Interface Software and Technology, Oct. 16, 2011, 10 pages.
Newcombe, et al., "KinectFusion Real-Time Dense Surface Mapping and Tracking", in Proceedings of International Conference on Research, Technology and Application in Mixed and Augmented Reality, Oct. 26, 2011, 10 pages.
Henry, et al., "RGB-D Mapping Using Depth Cameras for Dense 3D Modeling of Indoor Environments", in Proceedings of International Symposium on Experimental Robotics, Dec. 18, 2010, 15 pages.
Celix, et al., "Monocular Vision SLAM for Indoor Aerial Vehicles", in Proceedings of the IEEE/RSJ Inter-national Conference on Intelligent Robots and Systems, Oct. 11, 2009, 8 pages.
Gemeiner, et al., "Improving Localization Robustness in Monocular SLAM Using a High-Speed Camera", in Proceedings of Robotics: Science and Systems, Jun. 25, 2008, 8 pages.
Mair, et al., "Efficient Camera-Based Pose Estimation for Real-Time Applications", in Proceedings of International Conference on Intelligent Robots and Systems, Oct. 11, 2009, 8 pages.
Debevec, et al., "Acquiring the Reflectance Field of a Human Face", Published on: Apr. 4, 2004, Available at: http://www.pauldebevec.com/Research/LS/.
Einarsson, et al., "Relighting Human Locomotion with Flowed Reflectance Fields", Retrieved on: Oct. 10, 2012, Available at: http://gl.ict.usc.edu/Research/RHL/.
Kanade et al., "A Stereo Machine for Video-rate Dense Depth Mapping and Its New Applications", IEEE Computer Society Conference on Computer Vision and Pattern Recognition, 1996, pp. 196-202,the Robotics Institute, Carnegie Mellon University, Pittsburgh, PA.
Miyagawa et al., "CCD-Based Range Finding Sensor", Oct. 1997, pp. 1648-1652, vol. 44 No. 10, IEEE Transactions on Electron Devices.
Rosenhahn et al., "Automatic Human Model Generation", 2005, pp. 41-48, University of Auckland (CITR), New Zealand.
Aggarwal et al., "Human Motion Analysis: A Review", IEEE Nonrigid and Articulated Motion Workshop, 1997, University of Texas at Austin, Austin, TX.
Shag et al., "An Open System Architecture for a Multimedia and Multimodal User Interface", Aug. 24, 1998, Japanese Society for Rehabilitation of Persons with Disabilities (JSRPD), Japan.
Kohler, "Special Topics of Gesture Recognition Applied in Intelligent Home Environments", in Proceedings of the Gesture Workshop, 1998, pp. 285-296, Germany.
Kohler, "Vision Based Remote Control in Intelligent Home Environments", University of Erlangen-Nuremberg/Germany, 1996, pp. 147-154, Germany.
Kohler, "Technical Details and Ergonomical Aspects of Gesture Recognition applied in Intelligent Home Environments", 1997, Germany.
Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.
Qian et al., "A Gesture-Driven Multimodal Interactive Dance System", Jun. 2004, pp. 1579-1582, IEEE International Conference on Multimedia and Expo (ICME), Taipei, Taiwan.
Zhao, "Dressed Human Modeling, Detection, and Parts Localization", 2001, the Robotics Institute, Carnegie Mellon University, Pittsburgh, PA.
He, "Generation of Human Body Models", Apr. 2005, University of Auckland, New Zealand.
Isard et al., "Condensation—Conditional Density Propagation for Visual Tracking", 1998, pp. 5-28, International Journal of Computer Vision 29(1), Netherlands.
Livingston, "Vision-based Tracking with Dynamic Structured Light for Video See-through Augmented Reality", 1998, University of North Carolina at Chapel Hill, North Carolina, USA.
Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.
Breen et al., "Interactive Occlusion and Collusion of Real and Virtual Objects in Augmented Reality", Technical Report ECRC-95-02, 1995, European Computer-Industry Research Center GmbH, Munich, Germany.
Freeman et al., "Television Control by Hand Gestures", Dec. 1994, Mitsubishi Electric Research Laboratories, TR94-24, Caimbridge, MA.
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Azarbayejani et al., "Visually Controlled Graphics", Jun. 1993, vol. 15, No. 6, IEEE Transactions on Pattern Analysis and Machine Intelligence.
Granieri et al., "Simulating Humans in VR", the British Computer Society, Oct. 1994, Academic Press.
Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", the Washington Post, Mar. 27, 1995, Science Psychology, 2 pages.
"Simulation and Training", 1994, Division Incorporated.
Besl, P., and McKay, N. 1992. A method for registration of 3D shapes. 239-256.
Blais, G., and Levine, M. D. 1995. Registering multiview range data to create 3D computer objects. IEEE Transactions on Pattern Analysis and Machine Intelligence (PAMI) 17, 8, 820-824.
Campbell, N. D.F., Vogiatzis, G., Hernandez, C., and Cipolla, R. 2010. Automatic 3D object segmentation in multiple views using volumetric graph-cuts. Image and Vision Computing (IVC), 14-25.
Chen, Y., and Medioni, G. 1992. Object modeling by registration of multiple range images. Image and Vision Computing (IVC) 10, 3, 145-155.
Cohen, J. M., Tariq, S., and Green, S. 2010. Interactive fluid-particle simulation using translating Eulerian grids. In Proceedings of the SIGGRAPH symposium on Interactive 3D Graphics and Games.

(56) References Cited

OTHER PUBLICATIONS

Curless, B., and Levoy, M. 1996. A volumetric method for building complex models from range images. In ACM Transactions on Graphics (SIGGRAPH).

Davison, A. J., and Murray, D. W. 1998. Mobile robot localisation using active vision. In Proceedings of the European Conference on Computer Vision (ECCV).

Elfes, A., and Matthies, L. 1987. Sensor integration for robot navigation: combining sonar and range data in a grid-based representation. In Proceedings of the IEEE Conference on Decision and Control.

Frahm, J.-M., Georgel, P. F., Gallup, D., Johnson, T., Raguram, R., Wu, C., Jen, Y.-H., Dunn, E., Clipp, B., and Lazebnik, S. 2010. Building Rome on a cloudless day. In Proceedings of the European Conference on Computer Vision (ECCV).

Furukawa, Y., Curless, B., Seitz, S. M., and Szeliski, R. 2010. Towards internet-scale multi-view stereo. In Proceedings of the IEEE Conference on Computer Vision and Pattern Recognition (CVPR).

Goesele, M., Curless, B., and Seitz, S. M. 2006. Multiview stereo revisited. In Proceedings of the IEEE Conference on Computer Vision and Pattern Recognition (CVPR).

Grand, S. L. 2007. Broad-phase collision detection with CUDA. In GPU Gems 3, Addison-Wesley Professional.

Hadwiger, M., Ljung, P., Salama, C. R., and Ropinski, T. 2008. Advanced illumination techniques for GPU volume raycasting. In ACM SIGGRAPH ASIA Courses. (2 Documents).

Harada, T. 2007. Real-time rigid body simulation on gpus. In GPU Gems 3, Addison-Wesley Professional.

Henry, P., Krainin, M., Herbst, E., Ren, X., and Fox, D. 2010. RGB-D mapping: Using depth cameras for dense 3D modeling of indoor environments. In Proceedings of the International Symposium on Experimental Robotics (ISER).

"First Office Action and Search Report Issued in Chinese Patent Application No. 201380068406.7", dated Mar. 2, 2017, 13 Pages.

"Second Office Action Issued in Chinese Patent Application No. 201380068406.7", dated Sep. 20, 2017, 7 pages.

\* cited by examiner

USING PHOTOMETRIC STEREO FOR 3D ENVIRONMENT MODELING

BACKGROUND

Three-dimensional computer models of a real-world environment are useful in a wide variety of applications. For example, such models can be used in applications such as immersive gaming, augmented reality, architecture/planning, robotics, and engineering prototyping.

There is an ongoing need to improve the realism that can be achieved using such three-dimensional (3D) computer models. However, the amount of realism that can be achieved is constrained by the amount of information available to the computer system about the real world environment and the objects in it. For example, material properties of objects and surfaces in the environment are typically difficult for a computer system to obtain in a fast, accurate and practical manner. Material properties of objects and surfaces include albedo (true color), radiance, irradiance, and other information about the types of materials scene objects consist of.

Existing systems for capturing material properties of objects in the environment typically rely on extensive hardware setups and use multiple controllable light sources and high-speed cameras. Another option is to use light sources and cameras on a gantry that circles the objects whose material properties are being assessed. These types of approaches are time consuming, expensive and difficult for novice users to implement.

The embodiments described below are not limited to implementations which solve any or all of the disadvantages of known equipment and methods for detecting material properties for 3D environment modeling.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Detecting material properties such as reflectivity, true color and other properties of surfaces in a real world environment is described in various examples using a single hand-held device. For example, the detected material properties are calculated using a photometric stereo system which exploits known relationships between lighting conditions, surface normals, true color and image intensity. In examples, a user moves around in an environment capturing color images of surfaces in the scene from different orientations under known lighting conditions. In various examples, surfaces normals of patches of surfaces are calculated using the captured data to enable fine detail such as human hair, netting, textured surfaces to be modeled. In examples, the modeled data is used to render images depicting the scene with realism or to superimpose virtual graphics on the real world in a realistic manner.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The term "image element" is used in this document to refer to a pixel, group of pixels, voxel, group of voxels, or other higher level component of an image.

The term "coarse 3D environment model" is used in this document to refer to a representation of a three dimensional real world region comprising objects and surfaces where that representation comprises smoothed approximations of objects and surfaces which do not represent fine detail such as texture of rough surfaces.

Figure 1:
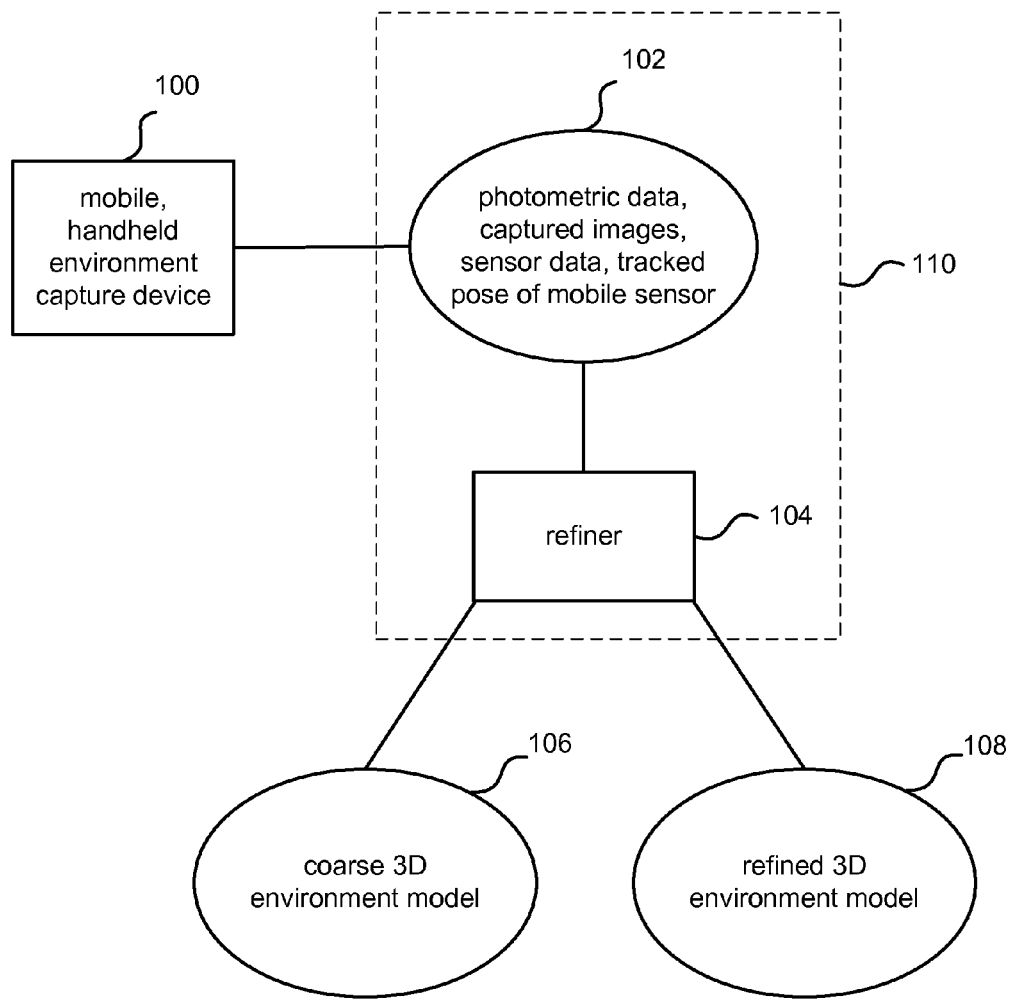
FIG. 1 is a schematic diagram of a system for detecting material properties of an environment and using the detected information to refine a 3D model of the environment.

FIG. 1 is a schematic diagram of a system 110 for detecting material properties for 3D environment modeling. A mobile environment capture device 100, which may be handheld, is used to capture photometric data 102, images, sensor data and also to track its own pose as it moves in an environment. For example, a person may hold the mobile environment capture device 100 whilst walking around a room in order to capture data about the room as described below with respect to FIG. 2. The data that the mobile environment capture device 100 captures comprises at least, high resolution color images captured under known lighting conditions, and data which enables the pose of the mobile environment capture device 100 to be tracked. The high resolution color images may be referred to as photometric data as the color images are captured by the mobile environment capture device 100 for different poses. The pose of the mobile environment capture device 100 may comprise a location and orientation of the device and may be provided as a six degree of freedom pose estimate of the color camera 302. It may comprise transformation parameters (also referred to as registration parameters) for transforms between pairs of depth map frames, or pairs of color images.

The mobile environment capture device 100 captures data which enables its pose to be tracked. For example, the mobile environment capture device 100 may have sensors to track its pose such as a global positioning system, a compass, an accelerometer or other similar sensors to enable pose to be tracked. In some examples, the mobile environment capture device 100 has a depth camera which may be used to capture depth images of the environment from which pose may be tracked. For example, by using an iterative closest point approach as described in US patent publication 20120196679 entitled "Real-Time Camera Tracking Using Depth Maps" Newcombe et al. filed on 31 Jan. 2011 and published on 2 Aug. 2012. The mobile environment capture device 100 may incorporate any suitable image capture device and/or sensors for enabling pose of the device to be tracked.

In the examples described below with reference to FIGS. 2 to 9 the mobile environment capture device 100 has a depth camera which may be used to capture depth images of the environment from which pose may be tracked. However, these examples may be modified to use other types of sensors to enable pose of the mobile environment capture device 100 to be tracked.

The data captured by the mobile environment capture device 100 may be used by a refiner 104 to refine a coarse 3D environment model 106 of the environment in which the device is moving. The coarse 3D environment model 106 may use any representation such as an oct-tree, triangular mesh, truncated signed distance function, or other representation from which an approximation of surfaces in the environment is obtained.

The refiner is computer-implemented using hardware and/or software and it uses the photometric data 102 and tracked pose to refine the coarse 3D environment model 106 and produce a refined 3D environment model 108. The refined 3D environment model is a representation of surfaces in the environment which represents finer detail of at least some parts of those surfaces, as compared with the coarse 3D environment model 106. The refined 3D environment model 106 may use any representation such as an oct-tree, triangular mesh, truncated signed distance function, or other representation.

In the examples described with reference to FIGS. 2 to 9 the mobile environment capture device is used to capture information which is used to create the coarse 3D environment model 106. However, this is not essential. The coarse 3D environment model 106 may be obtained from any source. For example, it may be pre-specified by an operator, it may be retrieved from a database containing location and geometry information.

Figure 2:
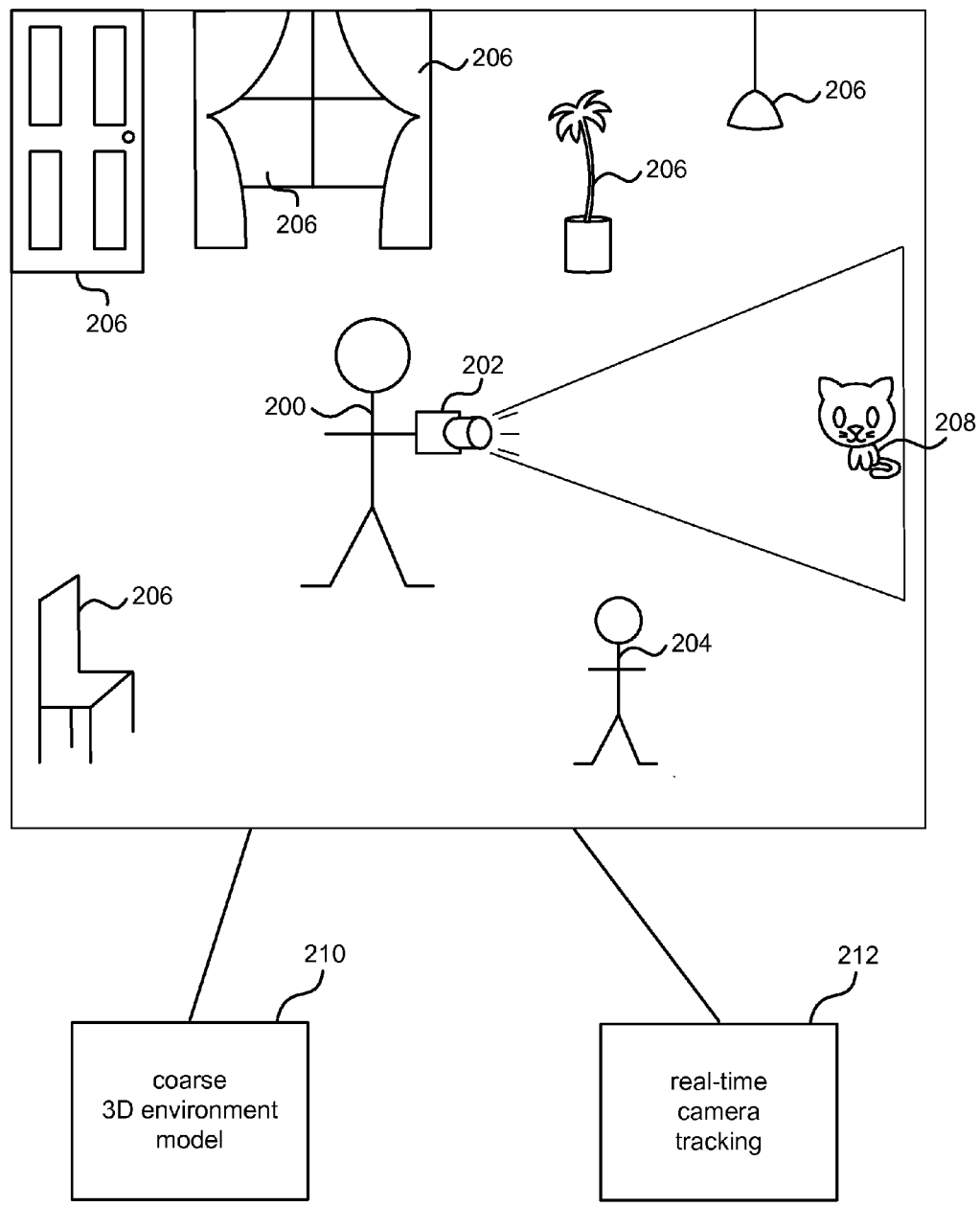
FIG. 2 is a schematic diagram of a person in a room holding a mobile environment capture device which may be used for capturing material properties of surfaces in the room and for real-time tracking.

FIG. 2 is a schematic diagram of a person 200 standing in a room and holding a mobile environment capture device 202 which in this example also incorporates a projector which is projecting the image of a cat 208 into the room. The room contains various objects 206 such as a chair, door, window, plant, light and another person 204. Many of the objects 206 are static although some of the objects such as person 204 may move. As the person moves around the room the mobile environment capture device captures images which are used by a real-time camera tracking system 212 to monitor the location and orientation of a camera (or cameras which are arranged to have co-incident view points) at the mobile environment capture device. The real-time camera tracking system 212 may be integral with the mobile environment capture device 202 or may be at another location provided that it is able to receive communication from the mobile environment capture device 202, either directly or indirectly. For example, the real-time camera tracking system 212 may be provided at a personal computer, dedicated computer game apparatus, or other computing device in the room and in wireless communication with the mobile environment capture device 202. In other examples the real-time camera tracking system 212 may be elsewhere in the building or at another remote location in communication with the mobile environment capture device 202 using a communications network of any suitable type. The mobile environment capture device 202 is also in communication with a coarse 3D model 210 of the environment (which in this case is a 3D model of the room) or another type of map of the environment. For example, images captured by the mobile environment capture device 202 are used to form and build up the coarse 3D model of the environment as the person moves about the room. The real-time camera tracking system 212 may track the position of the camera in relation to the 3D model or map of the environment. The outputs of the real-time camera tracking system 212 and coarse 3D model or map 210 may be used by a game system or other application although that is not essential. For example, a projector at the mobile environment capture device 202 may be arranged to project images depending on the output of the real-time camera tracking system 212 and 3D model 210. For example, the images may be used to seamlessly merge a virtual character into the real scene by using information about material properties of the environment captured by the mobile environment capture device, for example, to correctly model inter-shadowing and reflectivity.

Figure 3:
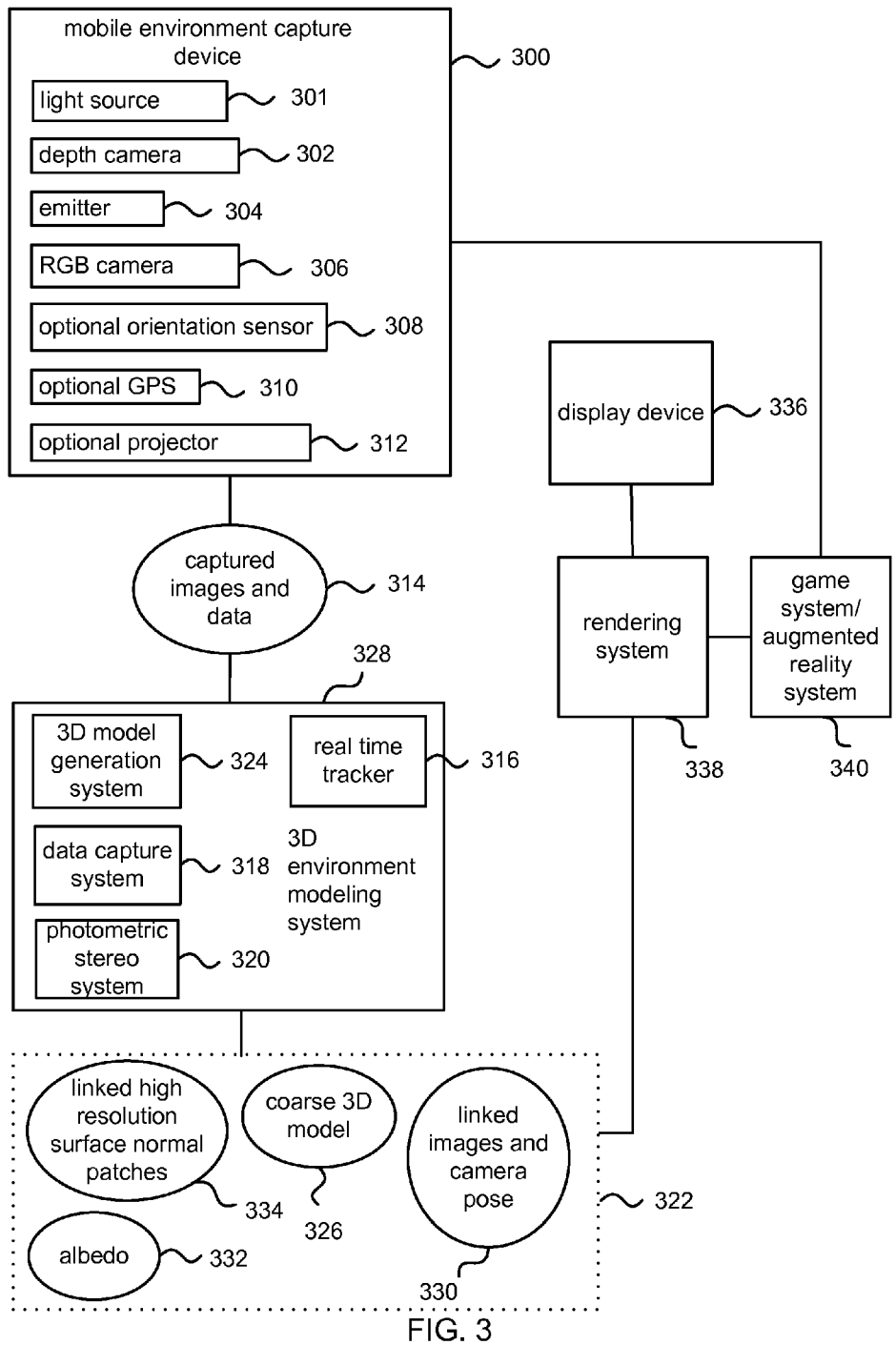
FIG. 3 is a schematic diagram of a mobile environment capture device, a 3D environment reconstruction system and a rendering system which may be used with a game system or augmented reality system.

FIG. 3 is a schematic diagram of a mobile environment capture device 300 for use with a 3D environment modeling system 328, a rendering system 338 and a game system or augmented reality system 340. The mobile environment capture device 300 captures images and data 314 as described above with reference to FIG. 1. The captured data 314 is used by a 3D environment modeling system 328 to refine and optionally also create, a 3D model 326 of the environment in which the mobile environment capture device 300 moved when it captured the captured data 314. A rendering system 338 is able to use the 3D model and associated data 322 to render images at a display device 336 or at a game system or augmented reality system 340. For example, to re-render the captured environment with increased realism and detail as compared with previous approaches. For example, to superimpose virtual graphics over the real world while correctly modeling inter-shadowing, reflectivity and other material properties. It is also possible to modify the appearance of real objects by projecting an image onto them which is pre-calibrated to take geometry, true color and lighting into consideration.

More detail about the mobile environment capture device 300 is now given. The mobile environment capture device 300 optionally comprises a depth camera 302 which is arranged to capture sequences of depth images of a scene. For example, a depth camera may be incorporated in the capture device 300 where the coarse 3D model is to be constructed using depth images captured by the capture device 300. In embodiments where the coarse 3D model is available from other sources the depth camera 302 may be omitted.

Each depth image (also called a depth map frame) 314 comprises a two dimensional image in which each image element comprises a depth value such as a length or distance from the camera to an object in the captured scene which gave rise to that image element. This depth value may be an absolute value provided in specified units of measurement such as meters, or centimeters or may be a relative depth value. In some cases the depth value may be a disparity value such as in situations where stereo depth information is available. In each captured depth image there may be around 300,000 or more image elements each having a depth value. The frame rate is high enough to enable the depth images to be used for working robotics, computer game or other applications. For example, at least 20 frames per second.

The depth information may be obtained using any suitable technique including but not limited to, time of flight, structured light, stereo images. In some examples the depth camera is able to organize the depth information into Z layers that are perpendicular to a Z axis extending along a line of sight of the depth camera.

The mobile environment capture device 300 may also comprise an emitter 304 arranged to illuminate the scene in such a manner that depth information may be ascertained by the depth camera 302. For example, in the case that the depth camera 302 is an infra-red (IR) time-of-flight camera, the emitter 304 emits IR light onto the scene, and the depth camera 302 is arranged to detect backscattered light from the surface of one or more objects in the scene. In some examples, pulsed infrared light may be emitted from the emitter 304 such that the time between an outgoing light pulse and a corresponding incoming light pulse may be detected by the depth camera and measure and used to determine a physical distance from the environment sensor 300 to a location on objects in the scene. Additionally, in some examples, the phase of the outgoing light wave from the emitter 304 may be compared to the phase of the incoming light wave at the depth camera 302 to determine a phase shift. The phase shift may then be used to determine a physical distance from the mobile environment sensor 300 to a location on the objects by analyzing the intensity of the reflected beam of light over time via various techniques including, for example, shuttered light pulse imaging.

In another example, the mobile environment sensor 300 can use structured light to capture depth information. In such a technique patterned light (e.g. light displayed as a known pattern such as a grid or stripe pattern) may be projected onto a scene using the emitter 304. Upon striking the surface of objects in the scene the pattern becomes deformed. Such a deformation of the pattern is captured by the depth camera 302 and analyzed to determine an absolute or relative distance from the depth camera 302 to the objects in the scene. In some cases, the mobile environment sensor 300 emits a spatially varying and/or time varying pattern of electromagnetic radiation and that pattern is calibrated so that when an image is received by the depth camera 302 it is able to perform pattern matching against a database of patterns and thus calculate depth information. This can be thought of as a 3D pattern of dots being projected into the environment, and wherever there is a surface that pattern is reflected so the depth camera 302 can detect it and calculate the distance of that surface from the depth camera 302.

In another example, the depth camera 302 comprises a pair of stereo cameras such that visual stereo data is obtained and resolved to generate relative depth information. In this case the emitter 304 may be used to illuminate the scene or may be omitted.

The mobile environment sensor 300 comprises a high resolution color video camera referred to as an RGB camera 306. The RGB camera 306 is arranged to capture sequences of images of the scene at visible light frequencies.

In embodiments where a depth camera and a color camera are present in the mobile environment capture device 300, the depth camera and the color camera may be arranged to share the same optical axis and optionally also the same principle point and field of view. However, this is not essential. Any set up and calibration process which enables the captured depth images to be mapped to the captured color images may be used. This may be achieved by using a single camera which is designed to capture both color and depth information. It is also possible to use more than one camera and arrange the optical axes of the cameras to be aligned by use of prisms, mirrors or other optical axis alignment equipment.

In some embodiments the mobile environment capture device 300 comprises other sensors, for example, to enable pose of the mobile environment capture device 300 to be tracked. For example, the mobile environment sensor 300 may comprise an orientation sensor 308 such as an inertial measurement unit (IMU), accelerometer, gyroscope, compass or other orientation sensor 308. The mobile environment sensor 300 may comprise a location tracking device such as a GPS although this is not essential.

The mobile environment capture device 300 may comprise a projector 312 as mentioned above with reference to FIG. 2 although this is not essential.

The mobile environment capture device 300 also comprises one or more processors, a memory and a communications infrastructure as described in more detail below.

The mobile environment capture device 300 may be provided in a housing which is shaped and sized to be hand held by a user or worn by a user. In other examples the mobile environment capture device 300 is sized and shaped to be incorporated or mounted on a vehicle, toy or other movable apparatus.

The mobile environment capture device 300 may be connected to a 3D environment modeling system 328. This connection may be a physical wired connection or may use wireless communications. In some examples the mobile environment capture device 300 is connected indirectly to the 3D environment modeling system 328 over one or more communications networks such as the internet.

The 3D environment modeling system 328 is computer implemented using a general purpose microprocessor controlling one or more graphics processing units (GPUs). It comprises a real time tracker 316, a data capture system 318, a photometric stereo system 320 and optionally, a 3D model generation system 324.

The real-time tracker 316 computes the pose of the camera, or optical axis aligned cameras, of the mobile environment capture device 300. This may be achieved using depth map frames (where a depth camera is available), using orientation sensors (where available) or in other ways. For example, the real time tracker 318 produces a real-time series of six degree of freedom pose estimates of the color camera 302. It may also produce transformation parameters (also referred to as registration parameters) for transforms between pairs of depth map frames, or pairs of color images.

The data capture system 318 implements a data capture strategy to decide which captured images and other data are to be saved, and to save that information in a manner which conserves space and facilitates real time operation. More detail about an example data capture system 318 is given below with reference to FIGS. 6 and 7.

The photometric stereo system 320 uses images and data captured by the data capture system 318 to compute material properties, and/or surface normals of fine scale patches of surfaces depicted in the images. The computed material properties and/or surface normals may be used to refine a coarse 3D model of the environment 326. More detail about an example photometric stereo system 320 is given below with reference to FIGS. 5 and 8.

The 3D model generation system 324 is optional because it is not needed in examples where the coarse 3D model 326 is available from another source. In examples where the coarse 3D model 326 is constructed by the 3D environment modeling system 328 the 3D model generation system 324 may aggregate information from captured depth map frames to form the coarse 3D model 326. This may be achieved as described in US patent publication 20120194516 entitled "Three-dimensional environment reconstruction" Newcombe et al. filed on 31 Jan. 2011 and published on 2 Aug. 2012. An example of a method of aggregating information from captured depth map frames to form the coarse 3D model is given below.

The output 322 of the 3D environment modeling system 328 comprises a coarse 3D model of the environment 326 (in examples where the 3D model generation system generates that), color images and camera poses 330 with links to associated locations in the coarse 3D model 326, optional material properties such as albedo 332 (also referred to as true color), and surface normals 334 at a high resolution for at least some specified surface patches of the coarse 3D model 326. Because the surface normals 334 are at a high resolution, fine detail of environment surfaces may be represented. By combining the surface normals 334 at high resolution with the coarse 3D model 326 a refined 3D environment model is obtained as described above with reference to FIG. 1. The functionality of the refiner 104 of FIG. 1 is provided by at least part of the 3D environment modeling system 328. The process of combining the surface normals 334 with the coarse 3D model may comprise bump-mapping by looking up the high resolution surface normals for surface patches of the coarse 3D model as required. In other examples, the process of combining the surface normals 334 with the coarse 3D model may comprise computing a new 3D model using the knowledge of the high resolution surface normals. For example, computing a smooth function which represents the surfaces in the environment and which takes into account the high resolution surface normals. The outputs 322 of the 3D environment modeling system 328 may be stored in GPU memory and/or in other types of memory as described in more detail below.

The mobile environment capture device 300 may be used in conjunction with a rendering system 338 (and display device 336) and a game system or augmented reality system 340. For example, the game may be a golf game, boxing game, motor car racing game or other type of computer game. Data from the game system 340 such as the game state or meta data about the game may be provided to the real-time tracker 316. Output 322 from the 3D environment modeling system 328 may be used by the game system/augmented reality system 340 to influence the course of a game or to influence how a virtual graphic is superimposed over the real world. Information from the 3D model may also be used by the game system 332 to influence the course of a game.

The processing performed by the 3D environment modeling system 328 and or the rendering system 338 can, in one example, be executed remotely from the location of the mobile environment capture device 300. For example, the mobile environment capture device 300 can be connected to (or comprise) a computing device having relatively low processing power, and which streams the captured images and data 314 over a communications network to a server. The server has relatively high processing power, and performs the computationally complex tasks of the 3D environment modeling system 328 and/or rendering system 338. The server can return a rendered image of the refined 3D model per-frame to provide an interactive experience to the user, and also return the final refined 3D model on completion of the model, for subsequent local use (e.g. in a game). Such an arrangement avoids the need for the user to possess a high-powered local computing device.

An example of a method of aggregating information from captured depth map frames to form the coarse 3D model is now given. A 3D model of a real-world environment may be generated in a 3D volume made up of voxels stored on a memory device. The model may be built from data describing a camera location and orientation and a depth image with pixels indication a distance from the camera to a point in the environment. A separate execution thread may be assigned to each voxel in a plane of the volume. Each thread uses the camera location and orientation to determine a corresponding depth image location for its associated voxel, determine a factor relating to the distance between the associated voxel and the point in the environment at the corresponding location, and updates a stored value at the associated voxel using the factor. Each thread iterates through an equivalent voxel in the remaining planes of the volume, repeating the process to update the stored value. The update may comprise an aggregation process and the stored value may be a value of a truncated signed distance function representing distance from the voxel to a surface depicted in the volume.

The 3D model may be stored in GPU memory or in other ways. For example, the dense 3D model may be stored as a linear array in slice-row-column order, optionally with some padding so that slices and rows align certain memory block sizes. For example, the model may be stored as a linear array of memory locations used to represent a 3D volume. This may be achieved by mapping each voxel (or other 3D image element such as a group of voxels) to a memory array index using a linear pitched memory which provides fast, parallel access to the data stored on the parallel computing unit memory. Each voxel may store a numerical value of a truncated signed distance function which may be zero at a surface represented by the model, positive outside objects represented by the model and negative inside objects represented by the model, where the magnitude of the numerical value is related to depth from the closest surface represented by the model.

Figure 4:
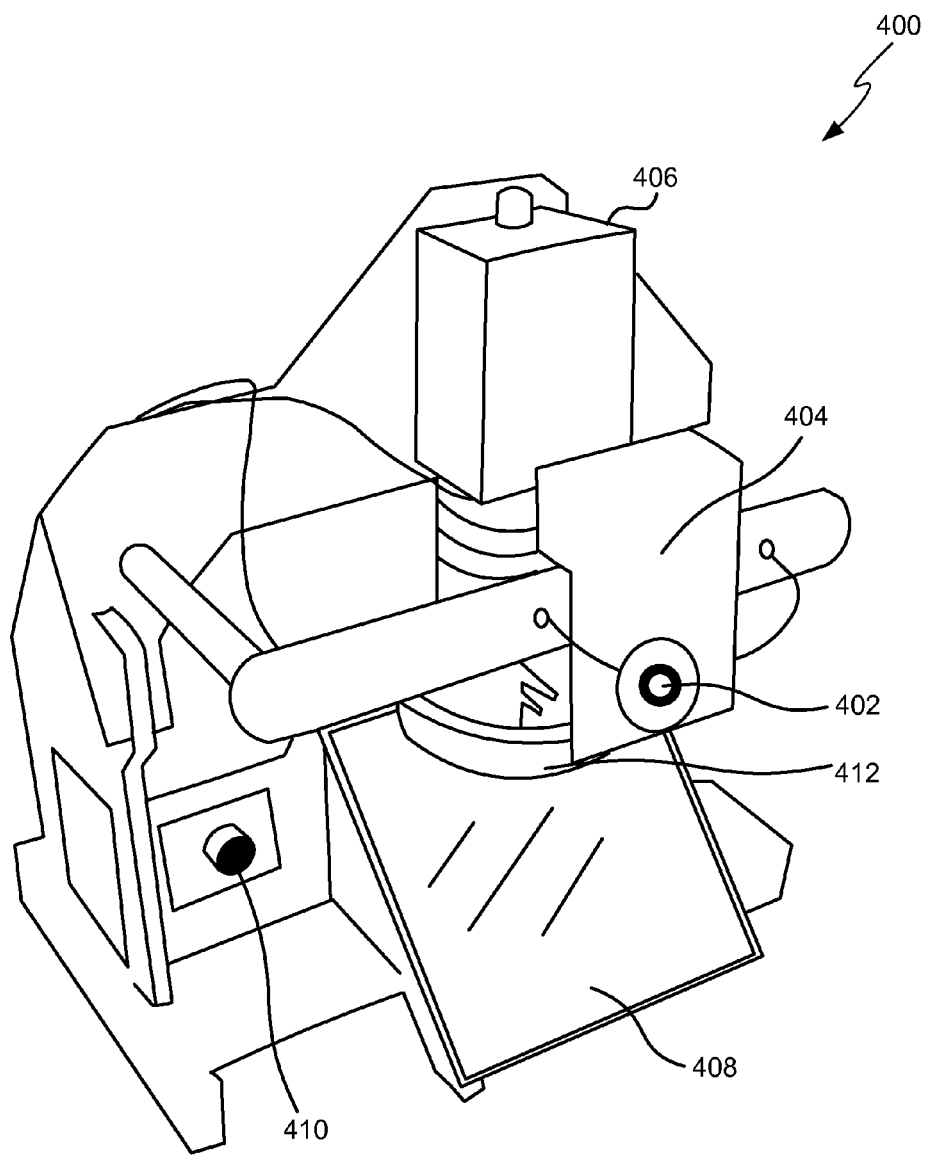
FIG. 4 is a perspective view of a hand held mobile environment capture device.

FIG. 4 is a perspective view of a hand held mobile environment capture device 400 suitable for use in the embodiments described above with reference to FIGS. 1 to 3. This is an example only as many other configurations and arrangements of the device may be used to achieve the same functionality. In particular, camera technology which combines depth and color in a smaller form factor may be used. Also, other arrangements of cameras may be used where the optical axes of the cameras are aligned using other equipment or arrangements of equipment.

In the example shown in FIG. 4 a high resolution color camera 406 with lens 412 is supported in a housing so that its optical axis is substantially vertical and approximately at 45 degrees to the plane of a cold mirror 408. Visible light from the environment is reflected from the cold mirror 408 into the color camera 412. A depth camera is also supported in the housing so that its optical axis is aligned with that of the color camera 412 by virtue of the cold mirror 408. The depth camera is not visible in FIG. 4 as it is located behind the cold mirror 408. Infra-red illumination reflected from surfaces in the environment, passes through the cold mirror 408 and into the depth camera. An infra-red laser 410 emits infer-red illumination into the environment which is then scattered and reflected into the depth camera. A point light source, which may be a high brightness light emitting diode 402 is mounted on a heat sink 404 attached to the housing. The position of the light emitting diode 402 is known with respect to the cameras.

Figure 5:
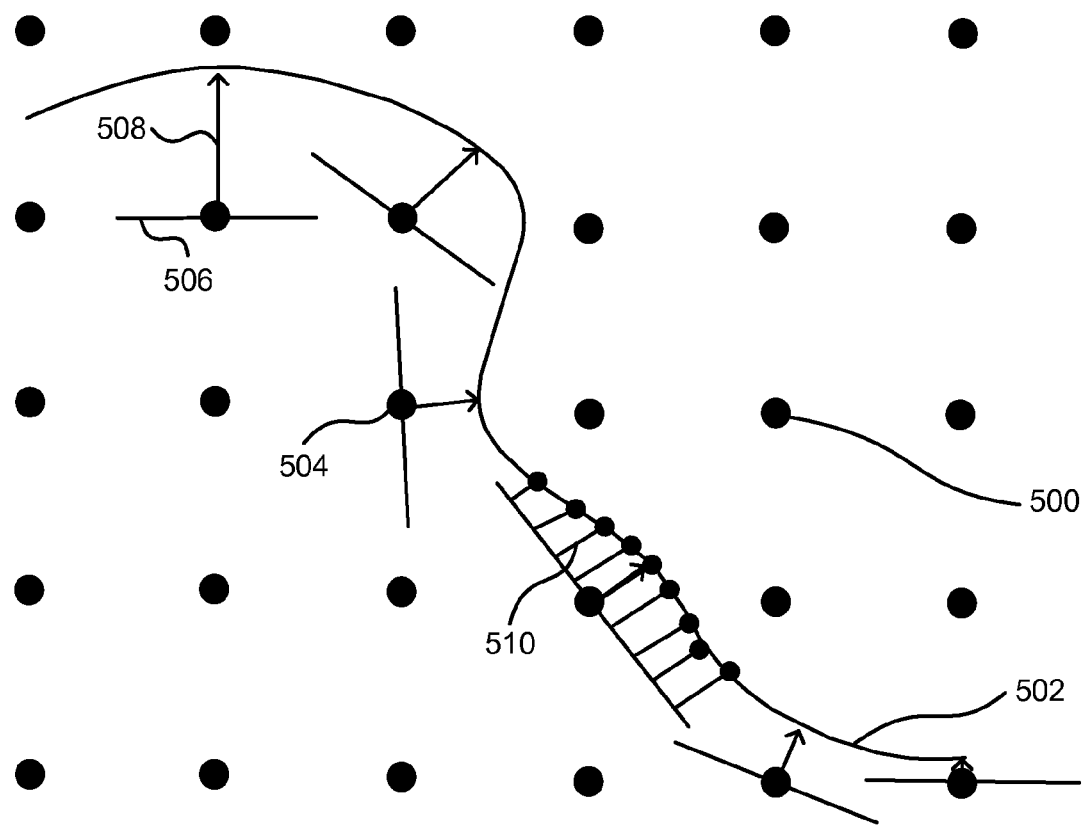
FIG. 5 is a schematic diagram of part of a 3D environment model.

FIG. 5 is a schematic diagram of part of a 3D environment model comprising a plurality of voxels 500 or other volumetric image elements. In this example, the model stores a truncated signed distance function representing surfaces in the environment. Each voxel may store a numerical value which may be zero at a surface represented by the model, positive outside objects represented by the model and negative inside objects represented by the model, where the magnitude of the numerical value is related to depth from the closest surface represented by the model. In the example shown in FIG. 5 part of a surface represented by the model is depicted by the curved line 502. In the example, six voxels which are close to the surface 502 are shown with arrows drawn from the centre of those voxels to the closest part of the truncated signed distance function represented by curved line 502. For example, voxel 504 has an arrow from its centre to the curved line 502. Each of these six voxels also have a line drawn through them which is perpendicular to the arrow to the curved line 502. For example line 506 is perpendicular to arrow 508.

The truncated signed distance function represented by curved line 502 is a smoothed approximation of the real world surface it represents. This is because the voxels are discrete and the curved line 502 is obtained by interpolating voxel values. Also, the voxel values may be obtained using an aggregation process which acts to smooth out fine detail. Because of this, the truncated signed distance function may not be able to represent fine detail such as netting, fur, hair, liquids, rough surfaces and other fine texture.

To enable fine texture to be represented, the photometric stereo system 320 may be used to compute surface normals at a higher resolution than available in the coarse 3D environment model. For example, the surface normals may be computed from diffuse reflections from the real world surface as seen by the color camera from multiple camera positions (with known lighting). For example, lines 510 in FIG. 5 indicate a plurality of positions within a single voxel. For each of those positions (which relates to a position in the real world) a surface normal is computed by the photometric stereo system 320. The surface normal indicates the orientation of a small region of the real world surface. By computing a surface normal for each of the lines 510, and for voxels close to the curved line 502 (which represents the real world surface), it is possible to represent finer detail than previously possible.

As the color images are high resolution, memory will quickly be used if unlimited color images are stored. Also, to enable processing at real time rates, the appropriate color images and camera poses associated with those images need to be quickly accessible by the photometric stereo system 320. An example of a memory structure and associated data capture strategy which may be used are now described with reference to FIGS. 6 and 7.

Figure 6:
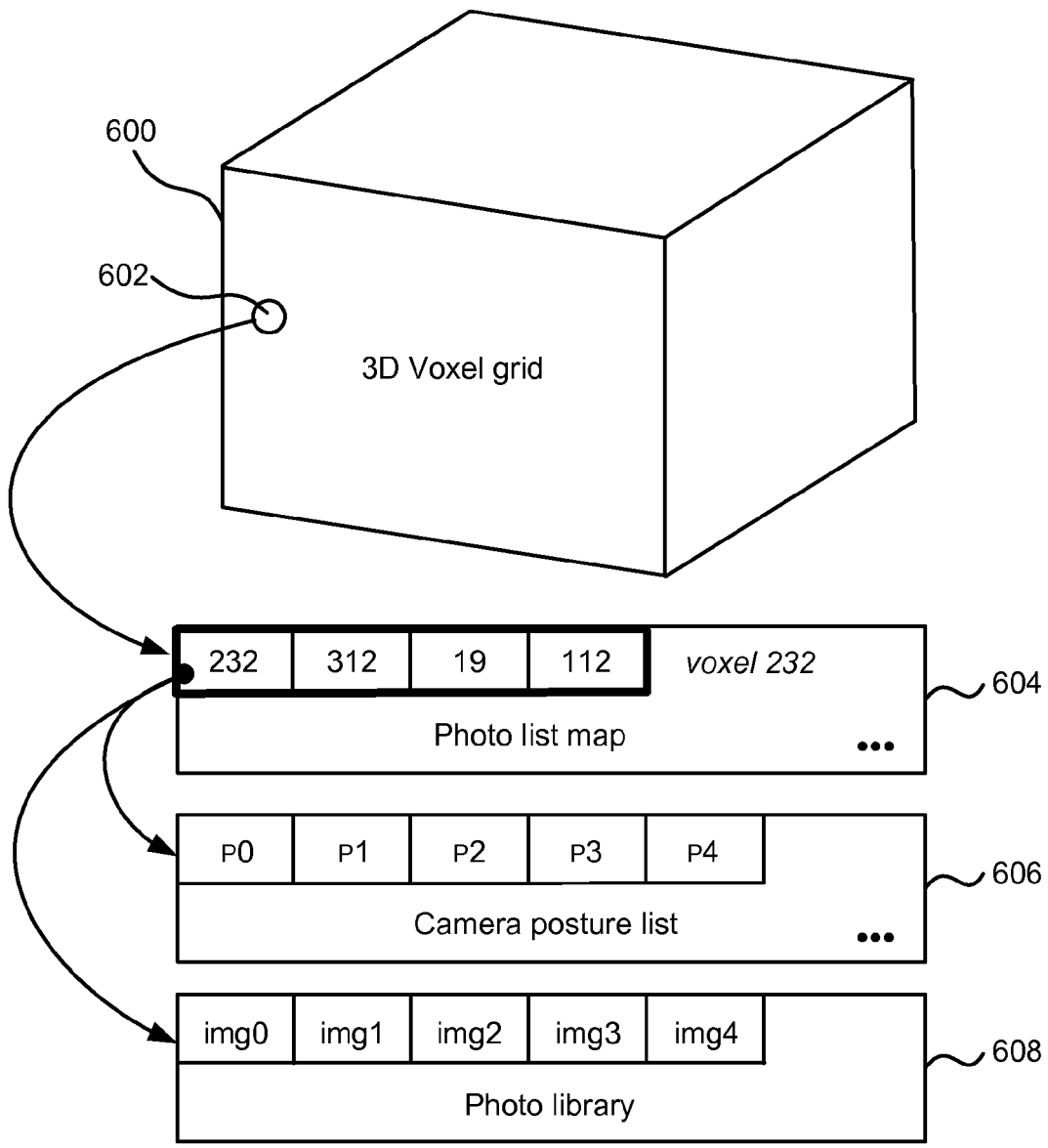
FIG. 6 is a schematic diagram of a 3D environment model having links to associated images.

In the example shown in FIG. 6 a 3D voxel grid 600 is stored in GPU memory and holds a truncated signed distance function representing surfaces in the real environment as described above. Each voxel 602 in the 3D voxel grid 600 stores a truncated signed distance function value and a pointer to an array of pointers 604 to associated color images. Each entry in the array of pointers 604 stores a pointer to a camera posture list 606 and a pointer to color images associated with the voxel 602. The color images associated with the voxel 602 selected for storage using a data capture strategy which is now described with reference to FIG. 7.

Figure 7:
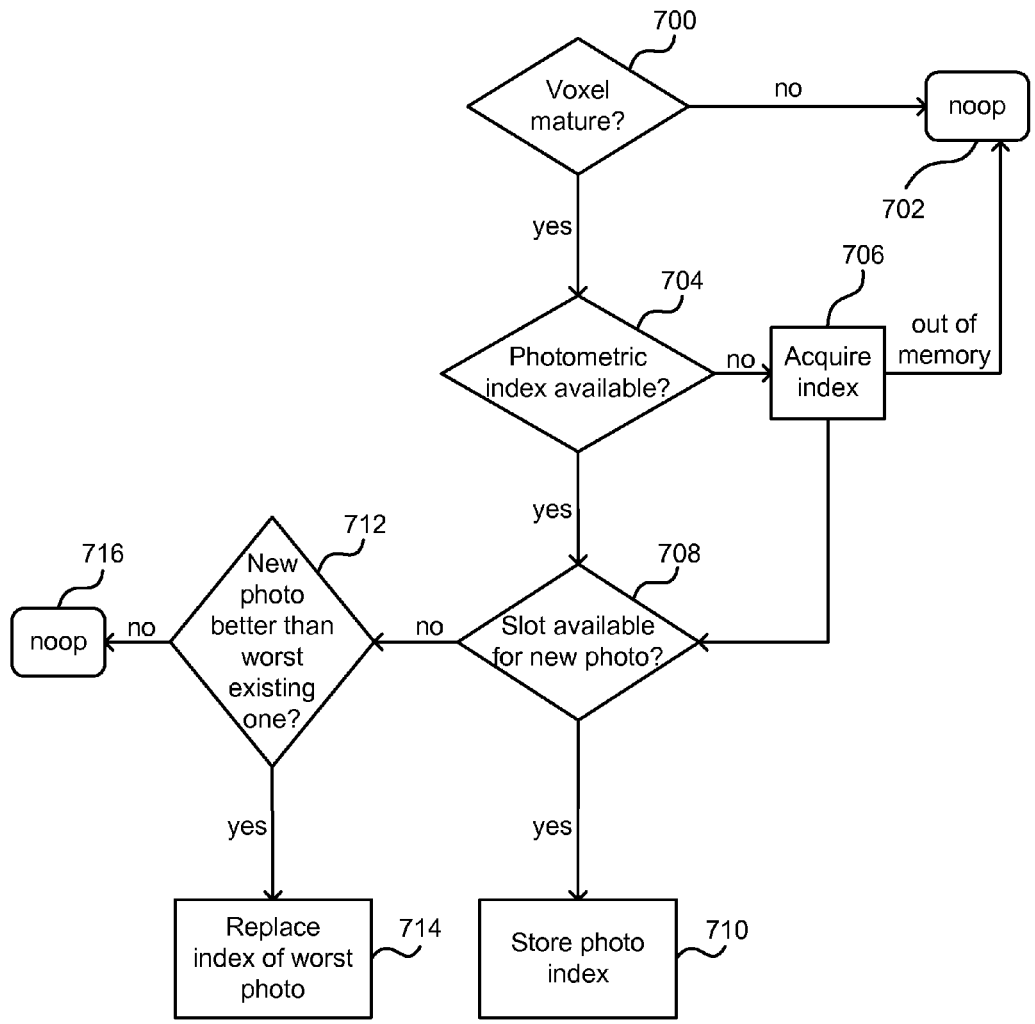
FIG. 7 is a flow diagram of a method of data capture.

The data capture strategy is carried out for one or more voxels of the 3D voxel grid 600. For example, voxels which are close to the truncated signed distance function such as the six voxels discussed above with reference to FIG. 5 are selected. For each selected voxel the process of FIG. 7 is carried out during color image capture. For example, where the mobile environment capture device is used to construct the coarse 3D environment model, a user may walk around in the environment until the coarse 3D environment model is established. The user may then activate the color camera and continue to walk around in the environment to refine the 3D environment model using photometric data.

The data capture strategy checks whether the selected voxel is mature 700. That is, has the truncated signed distance function value been established for this voxel? If not, no action is taken 702 so that it is possible to wait for another process, which is constructing the truncated signed distance function, to proceed. This step may be omitted where the coarse 3D environment model is known to be available. If the voxel is mature, a check 704 is made as to whether a photometric index is available. The photometric index is a pointer stored at the voxel which points to the array of pointers 604. If no photometric index is available an index is acquired 706 by allocating a pointer to the voxel. If the index cannot be acquired, for example, if there is no memory left, the process returns to the inactive state 702. If the index is successfully acquired, a check 708 is made as to whether a slot is available for a new photo. If so, a photo index 710 is stored in the array of pointers 604 which points to a photo slot in a photo library 608. If no slot is available then a decision is made 712 as to whether the new photo is better than the worst existing photo stored for the voxel. The criteria for selecting better photos may be any one or more of: whether the voxel is depicted towards the center of the photo, whether the camera pose is fronto-parallel to the truncated signed distance function at the voxel, how close the camera is to the surface depicted at the voxel, or other criteria. For example, any criteria related to any one or more of:

distance between the center of the image and the voxel;
distance between the camera and the surface depicted by the voxel;
relationship between the camera pose and the surface depicted by the voxel.

If the new photo is determined to be better than the worst existing photo, it is used to replace 714 the worst existing photo. Otherwise no action is taken 716.

If the depth and color cameras are not perfectly aligned and calibrated, high angles between camera ray and surface can yield incorrect and strongly distorted photometric samples. Thus, in some examples, color images captured from a steep angle may be excluded. For example, a threshold camera ray to surface angle may be used to select which color images are stored.

Figure 8:
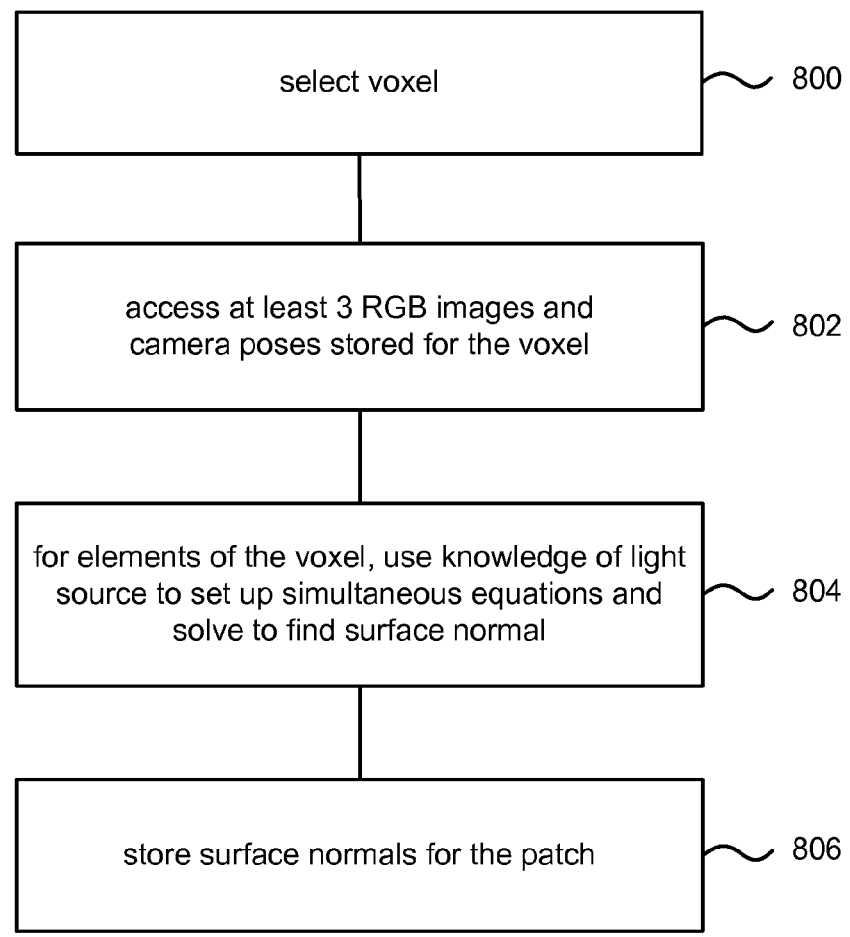
FIG. 8 is a flow diagram of a method at a photometric stereo system.

FIG. 8 is a flow diagram of an example method at the photometric stereo system 320 of FIG. 3. This process may be implemented in parallel at the graphics processing unit or other parallel processing unit.

Photometric stereo is a process for estimating surface normals of a surface in the environment by observing that surface under different lighting conditions. A known approximate relationship exists between light intensity in the environment, the light direction, the surface normal of a patch of a surface in the environment being considered, and the true color of that patch. This approximate relationship may be a simplified model of light transport as used in computer graphics. For example, this approximate relationship may be expressed as:

A vector representing light direction, multiplied by a vector representing the surface normal of the patch, the result of the product having added to it the true color of the patch, equals the light intensity observed at the patch.

This approximate relationship or other more complex versions of it may be used by the photometric stereo system.

By using at least three of the high resolution color images, taken of a particular surface patch, from different camera poses it is possible to set up three simultaneous equations using the above relationship. The light intensity observed at the patch is obtained from the color images and the light direction is known from the known position of the light emitting diode on the mobile environment capture device. The true color of the patch may not be known. By solving the simultaneous equations an estimate of the surface normal is obtained. This estimate may comprise some error and give workable results. For example, an assumption is made that the image capture occurs in an environment that is completely dark aside from the lighting contribution stemming from the known light sources, or in an environment with ambient lighting conditions which may be calibrated for.

The light intensity observed at the patch is known to vary (attenuate) depending on the distance to the surface that is illuminated and depending on the angle of the emitted ray. This attenuation may be compensated by making appropriate calculations at the photometric stereo system.

With reference to FIG. 8 the photometric stereo system may select 800 a voxel for which surface normals are to be calculated from photometric stereo. As described with reference to FIG. 5 voxels close to, or adjacent to the surface represented in the coarse 3D environment model may be selected. The photometric stereo system access 802 at least three color images and associated camera poses stored for the voxel. The camera poses of the three color images are different. Each color image depicts the voxel as described above.

A plurality of elements of the voxel are selected, for example, positions within the voxel which lie on a plane that is substantially fronto-parallel to the surface depicted by the voxel. For each of the elements, simultaneous equations are calculated 804 to obtain an estimate of the surface normal depicted at that element. The simultaneous equations are set up and calculated as described above. The estimated surface normals for the elements are stored 806 for the patch. These may be stored in GPU memory or elsewhere.

Figure 9:
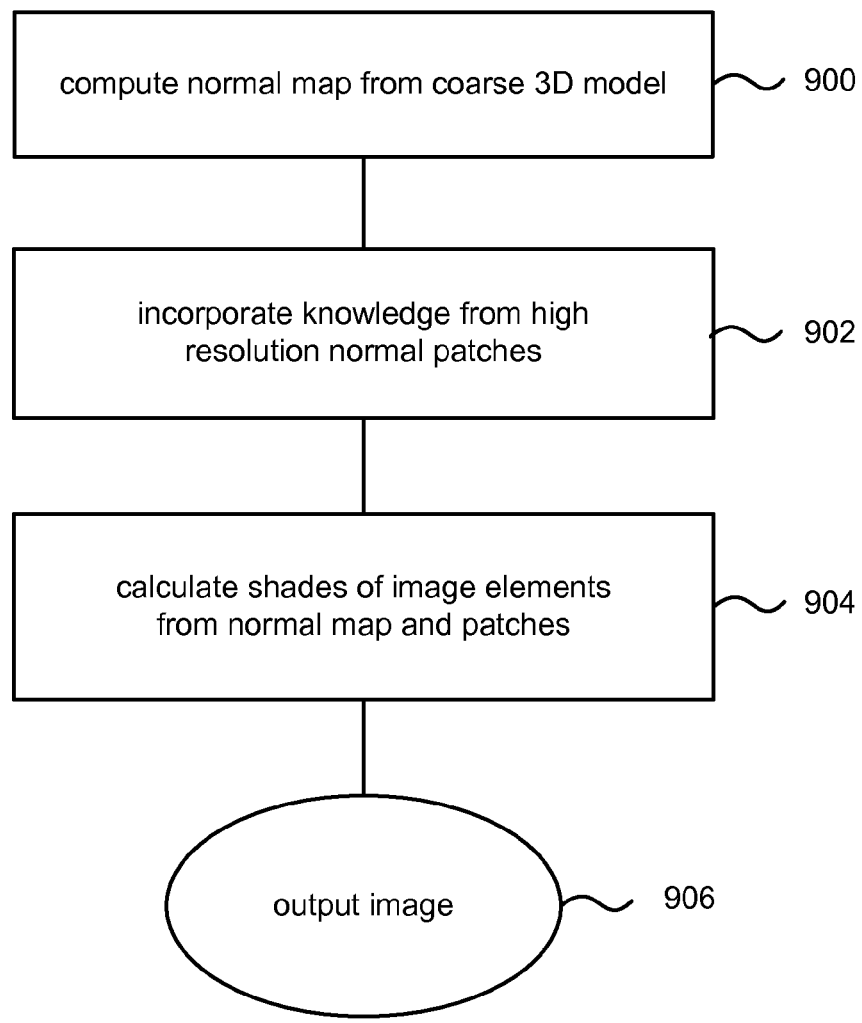
FIG. 9 is a flow diagram of a method at a rending system.

FIG. 9 is a flow diagram of a method at a rendering system. The rendering system is able to compute 900 a normal map from the coarse 3D model. Any suitable method of computing the normal may be used. For example, a method is described in US patent publication 20120194516 entitled "Three-dimensional environment reconstruction" Newcombe et al. filed on 31 Jan. 2011 and published on 2 Aug. 2012. Once a normal map is available, computer graphics techniques may be used to render an image. For example, image element shades (colors) may be calculated from the normal map. A normal map is a two dimensional array (in the form of an image) where each array element stores a value representing a surface normal of a surface depicted by an image corresponding to the normal map. A normal map may be stored in any form, not necessarily as a two dimensional array.

The rendering system incorporates into the normal map, knowledge from the high resolution normal patches calculated by the photometric stereo system. Thus some patches of the normal map effectively have a higher resolution. The rendering system calculates 904 shades of image elements of an image to be rendered. When calculating the shades the rendering system takes into account the surface normals of the patches from the photometric stereo system. In this way an output image 906 is obtained which may be displayed at any suitable display.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 10:
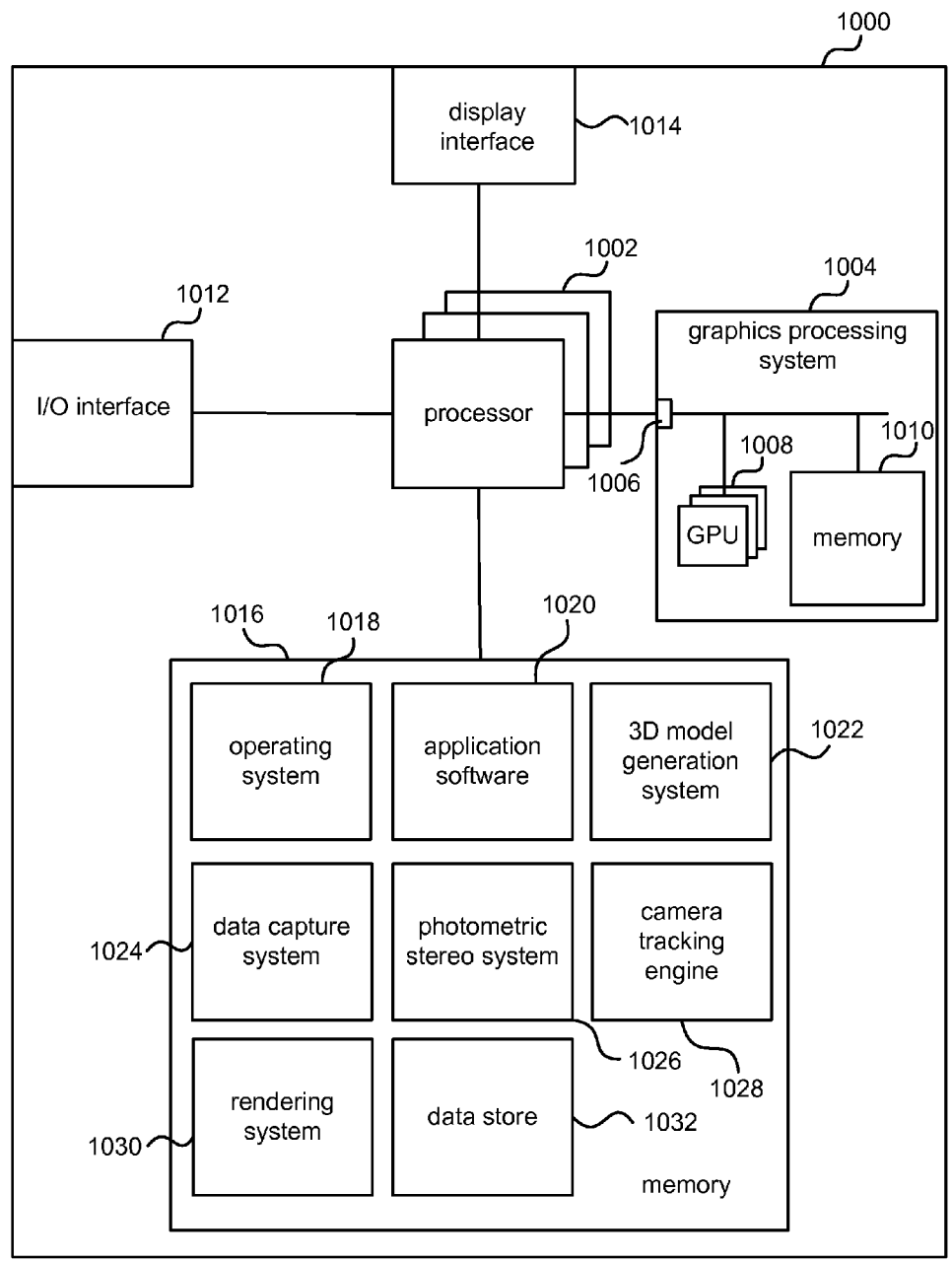
FIG. 10 illustrates an exemplary computing-based device in which embodiments of a system for detecting material properties for 3D environment modeling may be implemented.

FIG. 10 illustrates various components of an exemplary computing-based device 1000 which may be implemented as any form of a computing and/or electronic device, and in which embodiments of a 3D environment modeling and rendering system may be implemented.

Computing-based device 1000 comprises one or more processors 1002 which may be microprocessors, controllers or any other suitable type of processors for processing computing executable instructions to control the operation of the device in order to provide a 3D environment modeling and rendering system. In some examples, for example where a system on a chip architecture is used, the processors 1002 may include one or more fixed function blocks (also referred to as accelerators) which implement a part of the method of 3D environment modeling and rendering in hardware (rather than software or firmware).

The computing-based device 800 also comprises a graphics processing system 1004, which communicates with the processors 1002 via a communication interface 1006, and comprises one or more graphics processing units 1008, which are arranged to execute parallel, threaded operations in a fast and efficient manner. The graphics processing system 1004 also comprises a memory device 1010, which is arranged to enable fast parallel access from the graphics processing units 1008. In examples, the memory device 1010 can store the 3D environment model, and the graphics processing units 1008 may perform any part or combination of the model generation, image rendering and photometric stereo calculations described above.

Platform software comprising an operating system 1018 or any other suitable platform software may be provided at the computing-based device to enable application software 1020 to be executed on the device. Other software than may be executed on the computing device 1000 comprises: 3D model generation system 1022, data capture system 1024, photometric stereo system 1026, camera tracking engine 1028, rendering system 1030. A data store 1032 is provided to store data such as previously received depth maps, color images, sensor data, registration parameters, user configurable parameters, other parameters, 3D environment models, game state information, game metadata, and other data.

The computing-based device 1000 comprises one or more input/output interfaces 1012 arranged to receive and process input from one or more devices, such as user input devices (e.g. mobile environment capture device, a game controller, a keyboard, a mouse). This user input may be used to control software applications or mobile environment capture. The input/output interface 1012 may also operate as a communication interface, which can be arranged to communicate with one or more communication networks (e.g. the internet). The input/output interface 1012 may output files, images or data in other forms.

A display interface 1014 is also provided and arranged to provide output to a display system integral with or in communication with the computing-based device. The display system may provide a graphical user interface, or other user interface of any suitable type although this is not essential. In an example, the display device 1014 may also act as the user input device if it is a touch sensitive display device.

In some examples the input/output interface 1012 may detect voice input, user gestures or other user actions and may provide a natural user interface (NUI). This user input may be used to control a game or other application. The output interface may also output data to devices other than the display device, e.g. a locally connected printing device.

The input/output interface 1012 and display interface 1014 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Computer executable instructions may be provided using any computer-readable media that is accessible by computing based device 1000. Computer-readable media may include, for example, computer storage media such as memory 1016 and communications media. Computer storage media, such as memory 1016, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1016) is shown within the computing-based device 1000 it will be appreciated that the storage may be distributed or located remotely and accessed via a network or other communication link.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method at a 3D environment modeling system comprising:
   at least one of accessing or generating a coarse 3D model of an environment, the coarse 3D model of the environment being generated in a 3D volume made up of a plurality of voxels and corresponding images stored on a memory device;
   receiving a first image of the environment captured, under specified lighting conditions, by a mobile environment capture device moved in an unplanned manner in the environment;
   obtaining at a processor, camera pose of at least one camera at the mobile environment capture device used to capture the received first image;
   determining whether a location in the memory device is available for the first image;
   based on a determination that the location is not available, determining whether the first image is higher quality than a second image stored in the memory device for one of the plurality of voxels;
   based on determining that the first image is higher quality than the second image stored in the memory device, replacing the second image stored in the memory device with the first image;
   calculating a representation of fine detail of surfaces in the environment, the representation of fine detail comprising at least one true color of the environment, the calculation being based at least in part on at least one surface normal of at least one element in the environment, the first image, camera pose, and lighting conditions;
   refining the coarse 3D model based at least in part on the representation of fine detail; and
   causing a projection of at least a portion of the refined 3D model into real space.

2. A method as claimed in claim 1 the representation of fine detail comprising surface normal estimates at a resolution capable of depicting textured surfaces.

3. A method as claimed in claim 1 comprising using the representation of surfaces in the environment to either render an image depicting at least part of the surfaces or to superimpose virtual graphics over the environment.

4. A method as claimed in claim 1 further comprising receiving a plurality of images comprising depth images and color images of the environment captured by the mobile environment capture device moved in the unplanned manner in the environment.

5. A method as claimed in claim 1 comprising accessing a coarse 3D model of the environment and refining the coarse 3D model using the representation of fine detail of surfaces.

6. A method as claimed in claim 4 comprising using a data capture strategy to select first image for storage, the data capture strategy comprising using selection criteria related to one or more of the following: distance of the mobile environment capture device to a surface in the environment, orientation of the mobile environment capture device with respect to a surface in the environment, relative position of a specified surface depicted in an image and the center of the image.

7. A method as claimed in claim 1 comprising:
   storing a 3D model of the environment using the 3D volume, the plurality of voxels associated with the 3D volume being related to a position in the 3D environment being modeled; and
   storing, at each voxel, a pointer to an array comprising pointers to memory locations storing camera pose and image data related to each voxel.

8. A method as claimed in claim 1 further comprising using the plurality of images to construct the coarse 3D environment model of the environment by aggregating information from the plurality of images.

9. A method as claimed in claim 8 further comprising refining the coarse 3D environment model by calculating the representation of fine detail for surface patches of surfaces depicted in the coarse 3D environment model.

10. A method as claimed in claim 1 further comprising obtaining the camera pose by one or more of the following: sensed data from position and orientation sensors at the mobile environment capture device, and calculating the camera pose from images captured by the mobile environment capture device.

11. A 3D environment modeling system comprising:
    a memory device;
    an input interface arranged to receive a first of an environment captured, under specified lighting conditions, by a mobile environment capture device moved in an unplanned manner in the environment;
    the input interface further arranged to perform at least one of accessing or generating a coarse 3D model of the environment, the coarse 3D model of the environment being generated in a 3D volume made up of a plurality of voxels and corresponding images stored on the memory device;

a processor arranged to obtain camera pose of at least one camera at the mobile environment capture device used to capture the received first image;

the processor further arranged to:
    determine whether a location in the memory device is available for the first image;
    based on a determination that the location is not available, determine whether the first image is higher quality than a second image stored in the memory device for one of the plurality of voxels based at least in part on one or more of the following:
        a distance from a voxel to the center of the first or the second image;
        a distance between the camera and a surface depicted by the voxel; and
        a relationship between the surface depicted by the voxel and a camera pose associated with the first or the second image; and
    based on determining that the first image is higher quality than the second image, replacing the second image stored in the memory device with the first image; and a photometric stereo system arranged to calculate a representation of fine detail of surfaces in the environment, the representation of fine detail comprising at least one true color of the environment, the calculation being based at least in part on at least one surface normal of at least one element in the environment, camera pose, the first image, and lighting conditions;

refining the coarse 3D model based at least in part on the representation of fine detail; and a projection engine arranged to cause a projection of at least a portion of the refined 3D model into real space.

12. A system as claimed in claim 11 the photometric stereo system being at least partially implemented using hardware logic selected from one or more of the following: a field-programmable gate array, a program-specific integrated circuit, a program-specific standard product, a system-on-a-chip, a complex programmable logic device, a graphics processing unit.

13. An augmented reality system comprising a 3D environment modeling system as claimed in claim 11, the augmented reality system being arranged to superimpose virtual graphics over a real world environment, the virtual graphics taking into account the representation of fine detail of surfaces in the environment.

14. A system as claimed in claim 11, wherein the processor is further arranged to obtain the camera pose by one or more of the following: sensed data from position and orientation sensors at the mobile environment capture device, and calculating the camera pose from images captured by the mobile environment capture device.

15. A computer-readable storage media storing device-executable instructions to:
    perform at least one of accessing or generating a coarse 3D model of an environment, the coarse 3D model of the environment being generated in a 3D volume made up of a plurality of voxels and corresponding images stored on the memory device;
    receive a first image of the environment captured, under specified lighting conditions, by a mobile environment capture device moved in an unplanned manner in the environment;
    obtain, at a processor, camera pose of at least one camera at the mobile environment capture device used to capture the first image;
    determine whether a location in the memory device is available for the first image;
    based on a determination that the location is not available, determine whether the first image is higher quality than a second image stored in the memory device for one of the plurality of voxels, based at least in part on comparing criteria of the first image to criteria of the second image, the criteria comprising one or more of the following:
        a distance from a voxel to the center of the first image or the second image;
        a distance between the camera and a surface depicted by the voxel; and
        a relationship between the surface depicted by the voxel and a camera pose associated with the first image or the second image;
    based on determining that the first image is higher quality than the second image, replacing the second image stored in the memory device with the first image;
    calculate a representation of fine detail of surfaces in the environment, the representation of fine detail comprising at least one true color of the environment, the calculation being based at least in part on at least one surface normal of at least one element in the environment, camera pose, the first image, and lighting conditions;
    refine the coarse 3D model based at least in part on the representation of fine detail; and
    cause a projection of at least a portion of the refined 3D model into real space.

16. A computer-readable storage media as claimed in claim 15 further comprising device-executable instructions to use the representation of surfaces in the environment to either render an image depicting at least part of the surfaces or to superimpose virtual graphics over the environment.

17. A computer-readable storage media as claimed in claim 15 further comprising device-executable instructions to receive a plurality of images comprising depth images and color images.

18. A computer-readable storage media as claimed in claim 15 further comprising device-executable instructions to:
    store a 3D model of the environment using the 3D volume represented in memory, the plurality of voxels associated with the 3D volume being related to a position in the 3D environment being modeled; and
    store, at each voxel, a pointer to an array comprising pointers to memory locations storing camera pose and image data related to each voxel.

19. A computer-readable storage media as claimed in claim 17 further comprising device-executable instructions to construct the coarse 3D environment model of the environment by aggregating information from the plurality of images.

20. A computer-readable storage media as claimed in claim 15 further comprising device-executable instructions to obtain the camera pose by one or more of the following: sensed data from position and orientation sensors at the mobile environment capture device, and calculating the camera pose from images captured by the mobile environment capture device.

* * * * *